March 17, 1953  M. P. WINTHER  2,631,705
MAGNETIC FLUID CLUTCH WITH NONCONDUCTIVE SURFACE COATING
Filed Sept. 6, 1949  2 SHEETS—SHEET 1

Martin P. Winther,
Inventor.
Haynes and Koenig
Attorneys.

March 17, 1953  M. P. WINTHER  2,631,705
MAGNETIC FLUID CLUTCH WITH NONCONDUCTIVE SURFACE COATING
Filed Sept. 6, 1949  2 SHEETS—SHEET 2

Martin P. Winther
Inventor.
Haynes and Koenig
Attorneys.

Patented Mar. 17, 1953

2,631,705

UNITED STATES PATENT OFFICE 2,631,705

MAGNETIC FLUID CLUTCH WITH NONCONDUCTIVE SURFACE COATING

Martin P. Winther, Gates Mills, Ohio, assignor, by mesne assignments, to Eaton Manufacturing Company, Cleveland, Ohio, a corporation of Ohio Application September 6, 1949, Serial No. 114,240

4 Claims. (Cl. 192—21.5)

This invention relates generally to dynamoelectric machines, and with regard to certain more specific features, to electro-magnetic clutches and the like employing a granular magnetic material; being an improvement upon the inventions disclosed in the application of myself and Ralph L. Jaeschke, Serial No. 71,844, filed January 21, 1949, for Dynamoelectric Machine and eventuated as U. S. Patent 2,604,964.

The invention has for its object the prevention or delay of disintegration of the flowable magnetic material employed in so-called magnetic-fluid clutches, brakes and the like; besides reducing the "break-away" torque. Briefly, it consists in applying to either or both magnetic surfaces of such a clutch or brake a layer of electrical insulating material which will block the flow of certain heretofore unknown, apparently strong electrical currents which flowed through the material and accelerated its disintegration. In order to present minimum reluctance to the magnetic field crossing the gap of the improved machine, I provide the stated insulating surface in a very thin layer amalgamated to the magnetic surface which simplifies and makes reliable and permanent the resulting construction. This layer is preferably constituted by a thin film of vitrified enamel or similar material amalgamated with the surface.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is an axial section of apparatus incorporating one form of the invention which employs eddy-current principles and direct magnetic coupling principles, being viewed approximately on line 1—1 of Fig. 2;

Similar reference characters indicate corresponding parts throughout the several views of the drawings.

Figure 1:
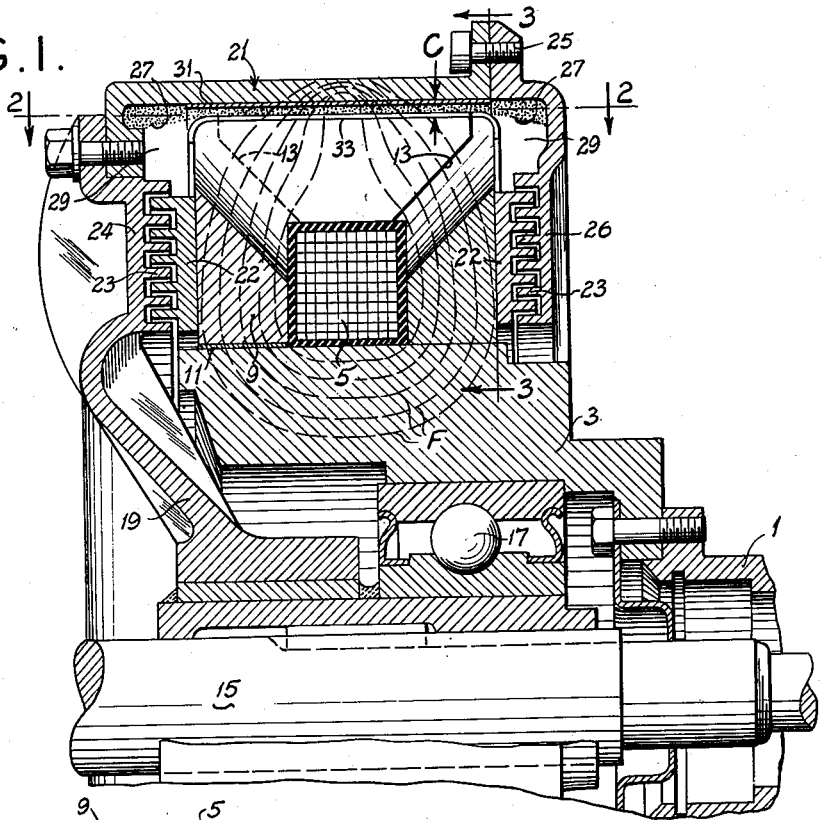
Figure 2:
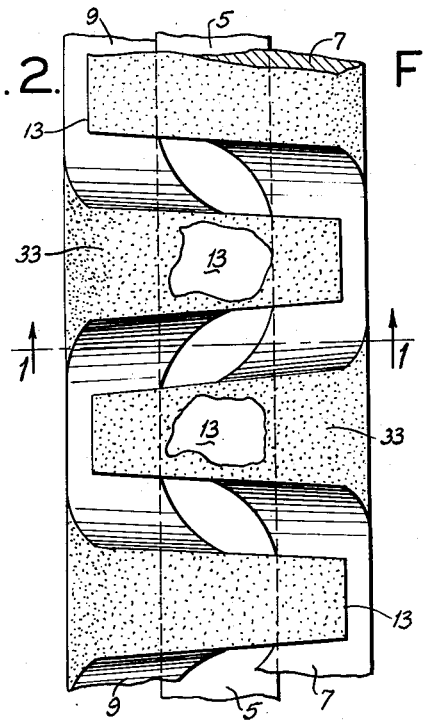
Fig. 2 is a developed plan view of certain polar teeth of a field member, being viewed generally from line 2—2 of Fig. 1.
Figure 3:
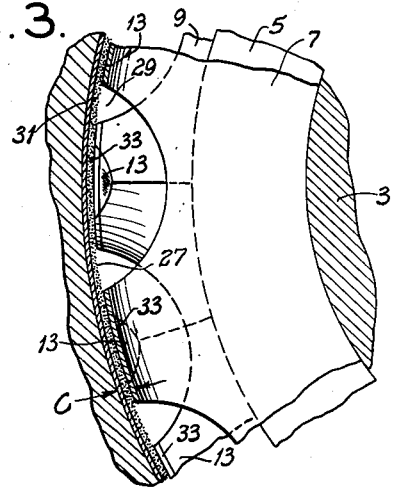
Fig. 3 is a fragmentary cross section taken on line 3—3 of Fig. 1.

Referring now more particularly to Figs. 1–3, there is shown at numeral 1 what may be considered initially to be a driving element to which is bolted a ferrous magnetic hub 3 of a field member. Carried on the hub 3 is an annular field coil 5 embraced on opposite sides by ferrous magnetic rings 7 and 9 which are fastened to the hub 3. Ring 7 is in direct magnetic contact with the hub, while a nonmagnetic band 11 (about .002 inch thick) is interposed between the ring 9 and the hub, providing a narrow magnetic gap. The material of the ring 11 may be copper, aluminum or the like. This band is optional but preferable for reasons which will appear.

Extending from the rings 7 and 9 and embracing the coil 5 are interdigitated pole-forming teeth 13, the inner faces of which lie adjacent the coil and the outer faces of which lie in or near an imaginary external cylinder. At numeral 15 is what may be referred to initially as a driven shaft between which and the hub 3 is a pilot bearing 17. Attached to the shaft 15 is a supporting spider 19, to the outside of which is attached a ferrous magnetic rotor 21, forming a smooth interior inductor surface lying in a cylinder slightly larger than the imaginary cylinder which embraces the outer faces of the poles 13. At numerals 23 are shown labyrinth running seals, the inner elements 22 of which fasten to the rings 7 and 9, respectively. The outer element 24 of one seal is formed in the spider 19 and the outer element 26 of the other seal is bolted to the inductor, as indicated at 25. The members 22, 24, 26 forming the labyrinth seals are preferably nonmagnetic. By exciting the coil 5, a toroidal flux field envelops it, as indicated by the dash lines F. This passes through the hub 3, rings 7, 9, teeth 13 and the inductor 21, crossing the member 11. Then if either member 1 or 15 is driven, the other will follow, due to magnetomotive reactions between the magnetic poles formed at the teeth 13 and the reactive magnetic field from eddy currents which are induced in the inductor 21.

A purely eddy-current slip coupling or clutch of the above-described nature operates with some slip; that is, it cannot be brought to complete synchronism because some relative rotation is necessary between the field and the inductor members in order to obtain the eddy currents necessary for the reactive magnetism.

In order to bring about complete synchronism when coil 5 is properly energized, there is provided within the inductor a mass of granular or finely divided magnetic material 27 which preferably includes an oily lubricant vehicle. A suitable material is a mixture of finely divided magnetic particles such as iron with oil, grease or the like. A finely divided magnetic iron serving the purpose is on the market under the name of Carbonyl-E iron; another is Swedish powdered iron of about 300 mesh. If oil is used, a 9:1 ratio by weight of iron particles to thin machine oil is satisfactory. In the case of the grease mixture, a satisfactory ratio by weight is 3:1 of iron to grease.

A quantity of the stated magnetic semisolid 27 is introduced in the chamber formed by the inductor 21 and under conditions of rotation is slung out centrifugally. The chamber is carried out laterally to form side channels 29 into which the magnetic mass 27 may move when the coil 5 is deenergized. When the coil 5 is energized, this mass is drawn into the magnetic gap C and, being magnetized, forms a mass in the gap having sufficient strength against shear that at normal operating torques the poles 13 and inductor 21 operate at synchronism. The increased shear strength is due to its magnetized condition. At higher torques acceleration may be aided by eddy-current inductive action in known manner.

When the coil 5 is deenergized, it is intended that the magnetic field F shall attenuate or collapse and disappear, thus demagnetizing the material 27 and reducing its shear strength to a point where substantially no coupling exists between the driving and driven members. A difficulty heretofore experienced has been that after the coil 5 has been deenergized, the field F is perpetuated due to residual magnetism of the hub 3, rings 7, 9, poles 13, inductor 21 and the magnetic iron in the gap C. It has heretofore been proposed to use the nonmagnetic ring 11 to introduce a magnetic gap into the magnetic circuit F. This gap is bridged by the field F when magnetomotive force exists from the coil 5. When said magnetomotive force disappears, the magnetic circuit F is broken at 11 and tends to collapse. However, even with this break, there is some tendency for the magnetic circuit to perpetuate itself by residual magnetism through the poles 13, inductor 21 and the magnetic mass 27 in the gap C. This is a condition of parasitic residual magnetism which is not entirely eliminated by the use of the gap at 11, although the latter does have substantial effect in breaking the magnetic circuit in the part that envelopes the coil 5.

It has also been found that, although clutches and the like of the class above described have a satisfactory life for some slow speed or light-load purposes, for other purposes (high-torque, high-speed applications) the flowable magnetic material, particularly of the oil or grease type deteriorates so rapidly that the clutches cannot always be used for such applications. This deterioration consists in a gradual solidification and balling of the material, this being apparently a polymerizing process. I believe that the cause of this is that a machine as above described has the following characteristics: An electrical potential is generated between the poles on the one hand and the inductor 21 on the other hand, and in addition, a potential difference exists between the central portion of the inductor 21 (above the coil 5) and its ends, the machine being basically a homopolar generator. If the magnetic gap C (as is the case when coil 5 is energized) becomes filled with a conductive material, such as the magnetic iron material described, currents will flow through this material sufficient to cause its deterioration in the manner indicated above.

It is to be understood that the above theory is tentative, but that in any event the physical solution to the problem of forestalling the deterioration and extending the operation life of the clutch is real. For example, increase in operating life has been obtained by test on clutches employing various suitable flowable magnetic material on the order of 100% up to 700%, making such clutches generally useful for the automotive and power clutch applications above referred to.

The present invention comprises forming a barrier between the magnetic and conductive particles of the flowable material and the remaining parts of the magnetic circuit, which barrier is nonmagnetic and nonconductive. Its nonmagnetic property magnetically isolates the magnetic particles when the magnetomotive force disappears. This causes the material promptly to collapse from its magnetically stiffened coupling state into its nonmagnetic flowable noncoupling state. And, even more importantly, the nonconductive character of the barrier prevents the stated heavy currents from flowing during periods of acceleration when there is relative motion between the tooth poles 13 and the inductor 21.

The stated barrier is preferably effected by applying to the inner surface of the inductor drum 21, or the outer surfaces of the poles 33, or both, a vitrified enamel. The advantages of this nonconductive, nonmagnetic form of barrier is that it may be applied thinly and accurately and becomes an integral, solid and reliable part of the magnetic iron member to which it is applied.

For example, the coating may be one of the usual vitreous frit materials such as are used in coating metal sanitary products such as wash basins, bath tubs, kitchen ware, et cetera. For example, a coating of frit is applied to the inside surface of the inductor 21, after which this part is raised to a temperature of the order of 1,500° F., at which temperature the frit becomes finally molten and amalgamates or heat bonds itself on the surface in a thin film. A single coating, although to some degree satisfactory, can be improved by applying two coats in order to avoid pinholes. The total thickness of the two coatings on a given iron surface after firing is preferably of the order of .003 inch. The resulting coating after firing is smooth and even. Its thinness minimizes its reluctance to traversal of the magnetic field. It is indicated at 31 on the inductor 21 and at 33 on the ends of the poles 13. The showing of its thickness in the drawings is necessarily exaggerated.

If it is desired to make use of the properties of this coating completely to pocket the magnetic material 27, then it should be placed both upon the inside of the inductor 21 and the outside of the poles 13. This is best from the viewpoint of magnetic isolation. However, its resistance effects are substantially the same when it is placed only on the inside of the inductor or on the outside of the poles. Thus, so far as the important nonconductive properties are concerned, it is sufficient to place it only upon the inside of the inductor 21 or upon the outsides of the poles 13.

The character of the frit required for the vitreous enameling is well known, but it may be mentioned that it is a preliminarily fused alkaline borosilicate glass, usually containing fluorine produced by melting a mixture such as borax, feldspar, quartz and cryolite. It is to be understood that any ceramic frit which will attach itself to metal by heat-firing is suitable, the primary consideration being that the resulting layer shall have the nonconducting characteristics of ceramics.

The limits of the nonmagnetic surface areas should be such as to intercept a substantial number of the lines of force in the magnetic field F. To this end, if desired, the area of coating 31 may be carried laterally further than shown and the plating areas on the poles 13 may be carried down their sides. However, the distribution as shown in the drawings, wherein the film on the poles 13 is on their outer faces, has been found practically to be sufficient.

Figure 4:
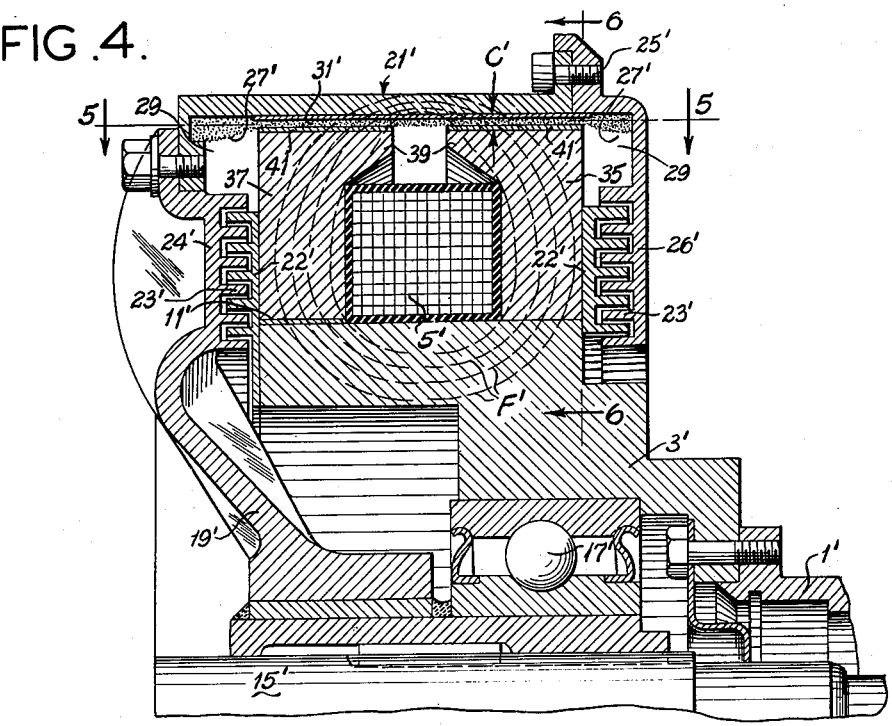
Fig. 4 is an axial section of an alternative form of the invention employing direct magnetic coupling principles only, being viewed from line 4—4 of Fig. 5.
Figure 5:
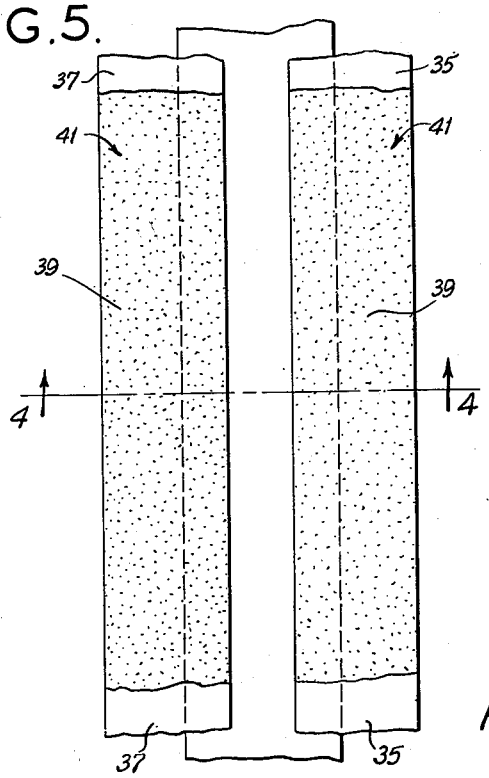
Fig. 5 is a developed plan view of pole rings of the field member of Fig. 4, being viewed generally from line 5—5 of Fig. 4; and, Fig. 6 is a fragmentary cross section taken on line 6—6 of Fig. 4.
Figure 6:
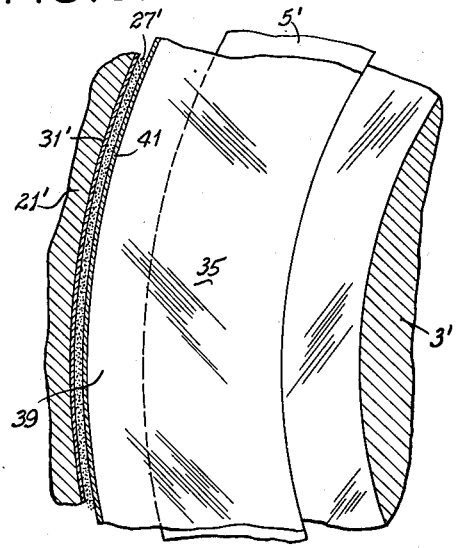

In Figs. 4-6 is shown another form of the invention in which like numerals designate like parts, except that in these figures the numerals representing like parts have been primed. Further description of these will be unnecessary from the above. Parts which are functionally different have been provided with new numerals, these being magnetic rings 35 and 37 on opposite sides of the exciter coil 5'. These rings, instead of being provided with discontinuous interdigitated polar teeth, have continuous peripheral polar teeth 39 to some extent overlapping the coil 5'. At 31' is shown the application of the nonconducting surface to the inside of the inductor 21'. At 41 is shown the application of the nonconductive surface to the exteriors of the annular poles 39. The difference in the operation of the form of the invention shown in Figs. 4-6 is that the density of the flux field F' traversing the gap C' between the poles 39 and the inductor 21' is continuous, peripherally considered; instead of discontinuous as in Figs. 1-3. The result is that no eddy currents will be induced in the inductor 21' upon relative rotation between 1' and 15'. Hence the entire driving action depends upon the shear force which the magnetic material 27' is capable of withstanding when magnetized and in the gap C'. Of course, when demagnetized, this shear force is negligible. Nevertheless, the invention is applicable to this invention shown in Figs. 4-6 because it assures a substantially complete elimination of residual magnetism of the material 27' in the gap C' when the coil 5' is deenergized. It also assures elimination of any destructive homopolar currents that may flow.

It will be understood that the invention will operate the same by making 15 the driver and 1 the driven member. Also, the driven member may be held stationary as in a brake, a brake being a clutch wherein the driven member is held stationary. Thus the term "clutch" as used herein comprehends brakes. Moreover, the inductor such as 21 or 21' may be located inside of an outside field member on which the polar teeth extend radially inward toward the inductor, instead of radially outward as shown. These alternatives are mere inversions and mechanical equivalents, as is well known.

It will also be understood that the invention is applicable to inductors such as 21 and 21' having interiorly interrupted surfaces such as, for example, the peripherally grooved type of inductor shown in the United States patent application Serial No. 87,885 of Anthony Winther filed April 16, 1949, eventuated as U. S. Patent 2,543,394.

While the theories regarding the invention above given are believed to be sound, it is to be understood that the invention has been found to be operative in practice, independently of any theory.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. An electromagnetic clutch comprising relatively rotary ferrous field and inductor members, the inductor member being a magnetic and conductive drum having a relatively uninterrupted surface, said field member comprising an annular excitation coil flanked by magnetic and conductive polar field members facing said inductor surface and forming relatively narrow gaps therewith, a magnetic mixture in the gaps and consisting of an oily lubricant vehicle deteriorative by heat, and finely divided ferrous particles, the latter being both magnetic and conductive, said coil when energized being adapted to form a magnetic circuit interlinking the polar and inductor members magnetically to stiffen the mixture in the gaps, at least one of the peripheral surfaces of the inductor and polar members which form the face and said gaps being provided with a substantially nonconductive surface adapted to prevent any substantial flow of current across the gaps and through said mixture, whereby electric heating and deterioration of the oily substance therein by such current flow across the gaps is prevented.

2. An electromagnetic clutch made according to claim 1, wherein said nonconductive peripheral surface consists of a layer of vitreous material heat-fused to the ferrous material of at least one of said relatively rotary members.

3. An electromagnetic clutch comprising relatively rotary ferrous field and inductor members, the inductor member being a magnetic and conductive drum having a relatively uninterrupted surface, said field member comprising an annular excitation coil flanked by magnetic and conductive polar field members facing said inductor surface and forming relatively narrow gaps therewith, a magnetic mixture in the gaps and consisting of an oily lubricant vehicle deteriorative by heat and finely divided ferrous particles, the latter being both magnetic and conductive, said coil when energized being adapted to form a magnetic circuit interlinking the polar and inductor members magnetically to stiffen the mixture in the gaps, both of the peripheral surfaces of the inductor and polar members which form the opposite sides of said gaps being provided with a relatively thin substantially nonconductive surface adapted to prevent any substantial flow of current across the gaps and through said mixture, whereby electric heating and deterioration of the oily substance therein by flow by such current across the gaps is prevented.

4. An electromagnetic clutch made according to claim 3, wherein said nonconductive peripheral surfaces each consist of a layer of vitreous material heat-fused to the ferrous materials constituting the relatively rotary members.

MARTIN P. WINTHER.

REFERENCES CITED

The following references are of record in the file of this patent:

UNITED STATES PATENTS

| Number | Name | Date |
|---|---|---|
| 1,981,259 | Wertz | Nov. 20, 1934 |

FOREIGN PATENTS

| Number | Country | Date |
|---|---|---|
| 28,824 | Great Britain | 1912 |
| 439,138 | Great Britain | Nov. 29, 1935 |
| 457,540 | Great Britain | Nov. 30, 1936 |
| 468,974 | Great Britain | July 16, 1937 |